Feb. 7, 1950 C. WITTE 2,496,927
FISHING LURE
Filed March 8, 1949
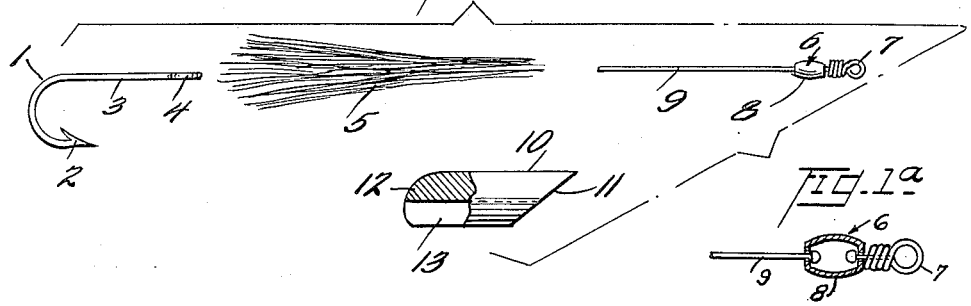
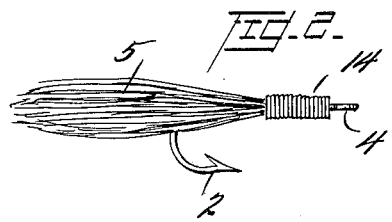 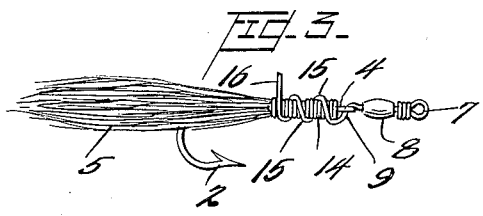
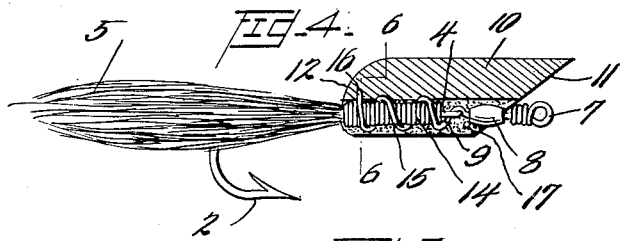
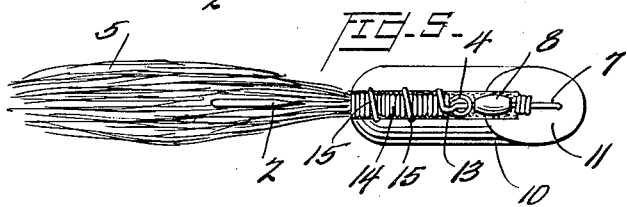
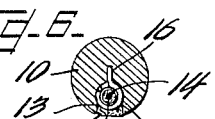
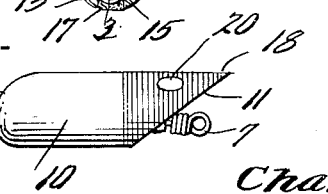
INVENTOR.
Charles Witte
BY
Parker Cook
ATTORNEY.

Patented Feb. 7, 1950

2,496,927

UNITED STATES PATENT OFFICE 2,496,927

FISHING LURE

Charles Witte, Ventnor City, N. J.

Application March 8, 1949, Serial No. 80,131

4 Claims. (Cl. 43—42.28)

My invention relates to new and useful improvements in fishing lures and the method of making the same, and has for an object to provide a lure that may quickly and readily be assembled and cheap to manufacture.

Still another object of the invention is to provide a fishing lure wherein the same will normally assume a horizontal, top-side-up position as the weight of the hook and the other parts to be mentioned as well as their positioning bring the center of gravity in a vertical plane below the center of buoyancy.

Still another object of the invention is to provide a lure wherein after the hook is secured in the body, it will, even after long service, maintain its original set position.

Still another object of the invention is to provide a lure having a swivel secured therein to the shank of the hook so that when the fisherman casts the lure there is less likelihood of the lure becoming entangled about the line or leader; and furthermore, it will permit the lure to have a more irregular action when drawn through the water.

Still another object of the invention is to provide a method wherein a bucktail is placed about the shank of the hook, cemented thereto, and then wrapped with a metal wire which forms a part of the swivel; and these parts then forced under pressure into a kerf in the balsa wood body, after which a wood plaster or other filler is used to fill in the kerf. The irregular surfaces formed by the wire wrapped around the bucktail, together with the wire's distal end forced into the body, will make a stronger and more positive setting for the hook and its connecting parts.

With these and numerous other objects in view, the invention consists in certain new and novel arrangements and method of manufacture, as will be hereinafter more fully described and pointed out in the claims.

Referring now to the drawings, showing a preferred embodiment,

Fig. 1 is a view showing the several parts before being assembled,

Fig. 1a is a longitudinal section of the swivel and its wire,

Fig. 2 shows the hook having the bucktail wrapped and cemented thereon,

Fig. 3 shows the next step of securing the swivel with its wire about the shank of the hook and leaving the distal end extending outwardly to be forced into the body of the lure, Fig. 4 is a sectional view showing the hook and its parts after being forced into the kerf, and the kerf filled with wood plaster, Fig. 5 is a bottom plan view showing the lure before the wood plaster had been filled in the kerf, Fig. 6 is a sectional view taken on line 6—6 of Fig. 4, and Fig. 7 is a view showing the completed lure.

Referring now for the moment to Fig. 1, there is shown a hook 1 with its barb 2, shank 3 and its eye 4. Also there may be noticed in Fig. 1 the strands or hairs 5 of a bucktail, which hairs 5 are to be secured to the shank 3 by wrapping with thread and then cemented for permanency.

Also there is the swivel 6 having its usual eye 7, the barrel 8, and from the barrel 8 extends the wire 9. Further there may be seen in Fig. 1 the lure proper or body 10, which is preferably made of balsa wood, has the angular front face 11, the rounded rear end 12 and a kerf 13 on its underside that runs throughout the length of the body 10.

Referring for the moment to Fig. 2, showing the first step in the assembling of the parts above mentioned, it will be noticed that the bucktail is placed around the shank 3 of the hook 1 and then wrapped with the thread 14; and after the thread 14 has been secured in position, the thread wrappings 14 may be coated with a light cement, such as "Duco," which hardens rapidly when exposed to the air. After the cement is dried, the swivel 6 has its wire 9 run through the eyelet 4 of the hook 1, and this wire 9 is then tightly wrapped around the cemented thread wrappings 14, thus forming the convolutions 15.

The free or distal end 16 of the wire 9 should extend outwardly for some little distance as clearly shown in Fig. 3, as this free end 16 is to be forced into the balsa body 10, as clearly shown in Fig. 4.

After the parts are assembled as shown in Fig. 3, they are then forced under pressure into the kerf 13 which is some few thousandths of an inch less in width than the outside diameter of the convolutions 15 wrapped around the shank 3 of the hook 1 in the bucktail.

Before forcing the hook 1 and its swivel 6 into this kerf 13, however, the kerf 13 should be partly filled with a "Duco" cement, so that not only will the protruding end 16 that is forced in the body 10 help prevent the hook 1 from turning, but the cement will bond with the walls of the kerf 13, the cement thread wrappings 14 and the irregular surfaces caused by the convolutions 15 of the twisted wire 9.

In other words, by having this wire 9 wrapped around the shank 3 of the hook 1, there are irregular surfaces formed which permit of a better bonding than if these convolutions 15 were not present. Furthermore, by having this wire 9 wrapped around the shank 3 and forced into a narrow kerf 13 the coils tend to cut their way into the soft balsa wood, thus providing a more permanent position or set in the kerf 13.

After the parts above mentioned have been forced under pressure into the kerf 13, that is, the hook 1 and its swivel 6, the kerf 13 is then filled with a wood or plastic or other desirable form of filler 17 to thus form a still further bond between the hook 1 and the body 10. Also, it gives the lure a finished appearance and protects the inserted parts.

It will also be noticed in Figs. 4, 5 and 7 that the eyelet 7 of the swivel 6 protrudes from the kerf 13 so that the desired swiveling action may be obtained.

Thus, when the lure is assembled there is little likelihood of the hook 1 and its shank 3 turning within the body 10; and the swivel 6 forms a permanent part of the lure, making it unnecessary for the fisherman to put one on his leader.

The final operation is the painting of the lure and as may be seen in Fig. 6, the forward end 18 of the body 10 may be painted any desired color, preferably red, the remaining part of the lure white, while spots 20 may also be painted on the forward end 18 to simulate eyes.

When in use the lure will normally assume a top-side-up horizontal position, although when connected by a gut leader (not shown) to a fishing line, it may hold the lure in an angular position rather than in a wholly horizontal one. In the same way when bait is put on the hook, which is always used with this lure, it may tilt the forward end 18 of the lure slightly upward; but in any event by having the weight displaced, as shown, the lure when submerged will always assume a top-side-up position.

Balsa wood has been mentioned throughout the specification as the material from which the body is made, but it will be understood that other types of wood bodies might be used.

It will also be understood that this lure is generally used where it is to extend about a foot or two or more from the sinker, and will thus float the bait off the bottom, thus giving the fish a better chance to get at the bait and also simulating live bait.

From the foregoing it will be seen that I have provided a lure which may be readily assembled, and the time consumed in its manufacture be reduced to a minimum.

Furthermore, the lure is one that is efficient in service and will withstand the hard usage to which it is put without twisting or turning the hook from its original set position.

Again, by using the special form of swivel having a wire instead of one of the usual eyelets, the wire makes a strong connection from the swivel to the hook, and prevents the hook from turning in the body of the lure; while the swivel projecting from the lure makes it unnecessary for the fisherman to carry additional swivels in his kit.

Many slight changes might be made without departing from the spirit and scope of the invention.

I am aware that several attempts have been made to provide a fishing lure wherein different means are provided to prevent the shank of the hook from turning in the lure after extended use, and I do not claim my invention broadly as such, but what I do claim and desire to secure by Letters Patent is:

1. A fishing lure, including a body provided with a kerf extending along its under-surface, a fish hook having a shank and an eyelet and a swivel including a barrel having an eyelet at one end and a wire at its other end, the said wire extending through the eyelet of said hook and coiled about the said shank, the distal end of the wire extending outwardly from the shank, the shank of the hook fitted tightly within said kerf, and the distal end of the said wire extending into the body of the lure, a filler sealing the said kerf, the swivel protruding beyond the forward end of the body of the lure, and the hook protruding from the rear end of the body of said lure.

2. A fishing lure, including a body provided with a kerf extending along its under-surface, a fish hook having a shank and an eyelet, the hairs of a bucktail secured to the said shank and a swivel including a barrel having an eyelet at one end and a wire at its other end, the said wire extending through the eyelet of said hook and coiled about the said shank, the distal end of the wire extending outwardly from the shank, the shank of the hook together with its coiled wire fitted tightly and cemented within said kerf, the distal end of the said wire extending into the body of the lure, a filler sealing the said kerf, the swivel protruding beyond the forward end of the body of the lure, and the hook protruding from the rear end of the body of said lure.

3. The method of making a fishing lure which consists in securing the hairs of a bucktail to the shank of a fish hook, placing a wire forming part of a swivel through the eye of the hook and coiling the said wire around the shank of the hook and the upper ends of the bucktail but leaving the distal end of the wire extending at substantially right angles to the shank of the hook, forcing under pressure the shank of the hook within a pre-cut kerf formed in a pre-shaped floatable body, the convolutions of the coil and its distal end being jammed bodily into the walls of the kerf, and then filling the kerf with a wood filler and painting the floatable body.

4. The method of making a fishing lure which consists in securing the hairs of a bucktail to the shank of a fish hook with thread and cement, placing a wire forming part of a swivel through the eye of the hook and coiling the said wire around the shank of the hook but leaving the distal end of the wire extending at an angle to the shank of the hook, forcing under pressure the shank of the assembled hook within a pre-cut kerf formed in a pre-shaped floatable body, partially filling the kerf with cement, the width of the kerf being less than the outside diameter of the coils so that the convolutions of the coil and its distal end are jammed bodily into the walls of the kerf, then filling the kerf with a filler and painting the floatable body.

CHARLES WITTE.

No references cited.